(12) United States Patent
Li et al.

(10) Patent No.: US 12,520,326 B2
(45) Date of Patent: Jan. 6, 2026

(54) PHYSICAL UPLINK CONTROL CHANNEL ENHANCEMENT FOR INDOOR COVERAGE HOLES

(71) Applicant: QUALCOMM Incorporated, San Diego, CA (US)

(72) Inventors: Qiaoyu Li, Beijing (CN); Chao Wei, Beijing (CN); Hung Dinh Ly, San Diego, CA (US); Chenxi Hao, Beijing (CN); Wanshi Chen, San Diego, CA (US); Hao Xu, Beijing (CN); Jing Dai, Beijing (CN); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 17/906,399

(22) PCT Filed: Apr. 21, 2020

(86) PCT No.: PCT/CN2020/085894
§ 371 (c)(1),
(2) Date: Sep. 15, 2022

(87) PCT Pub. No.: WO2021/212315
PCT Pub. Date: Oct. 28, 2021

(65) Prior Publication Data
US 2023/0133217 A1 May 4, 2023

(51) Int. Cl.
*H04W 72/232* (2023.01)
*H04W 72/04* (2023.01)
*H04W 72/1268* (2023.01)

(52) U.S. Cl.
CPC ......... *H04W 72/232* (2023.01); *H04W 72/04* (2013.01); *H04W 72/1268* (2013.01)

(58) Field of Classification Search
CPC ............... H04W 72/232; H04W 72/04; H04W 72/1268
See application file for complete search history.

(56) References Cited

U.S. PATENT DOCUMENTS 10,070,464 B2 * 9/2018 Tang .................... H04L 5/0055
12,232,107 B2 * 2/2025 Gerami .................... H04L 1/08
(Continued)

FOREIGN PATENT DOCUMENTS

| CN | 107113137 A | 8/2017 |
|---|---|---|
| CN | 107580797 A | 1/2018 |

(Continued)

OTHER PUBLICATIONS

Ericsson: "Correction to eMTC Test Case (CEModeB) to Support Repetition Factor 1," 3GPP TSG-RAN5 Meeting #76, R5-175160, Aug. 21-25, 2017 (Aug. 25, 2017), 5 pages, the whole document.

(Continued)

*Primary Examiner* — Michael J Moore, Jr.
(74) *Attorney, Agent, or Firm* — Patterson & Sheridan, L.L.P.

(57) ABSTRACT

A user equipment (UE) may receive a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and may transmit at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

20 Claims, 12 Drawing Sheets

(56) References Cited

U.S. PATENT DOCUMENTS

| | | | |
|---|---|---|---|
| 2016/0270033 | A1 | 9/2016 | Yang et al. |
| 2016/0330633 | A1 | 11/2016 | You et al. |
| 2019/0306852 | A1 | 10/2019 | Nayeb Nazar et al. |
| 2019/0313342 | A1 | 10/2019 | Papasakellariou |
| 2020/0245367 | A1* | 7/2020 | Sun .................. H04W 74/0833 |
| 2021/0360614 | A1* | 11/2021 | Baldemair ........ H04W 72/1263 |
| 2023/0060179 | A1* | 3/2023 | Yin ....................... H04L 5/0012 |
| 2023/0124792 | A1* | 4/2023 | Deghel ................. H04W 72/02 |
| | | | 370/329 |
| 2023/0133217 | A1* | 5/2023 | Li ........................ H04W 72/21 |
| | | | 370/329 |

FOREIGN PATENT DOCUMENTS

| | | |
|---|---|---|
| CN | 110535571 A | 12/2019 |
| CN | 110958695 A | 4/2020 |
| EP | 3832929 A1 | 6/2021 |
| WO | 2020026295 A1 | 2/2020 |

OTHER PUBLICATIONS

International Search Report and Written Opinion—PCT/CN2020/085894—ISA/EPO—Jan. 22, 2021.
Supplementary European Search Report—EP20932724—Search Authority—Berlin—Aug. 11, 2023.

* cited by examiner

| Format | #symbols | #UCI bits | Waveform | Description |
|---|---|---|---|---|
| 0 | 1 - 2 | ≤ 2 | CGS seq | Short |
| 1 | 4 - 14 | ≤ 2 | CGS seq | Long |
| 2 | 1 - 2 | > 2 | OFDM | Short |
| 3 | 4 - 14 | > 2 | DFT-S-OFDM | Long w/o multiplexing capability |
| 4 | 4 - 14 | > 2 | DFT-S-OFDM | Long w/ multiplexing capability |

PHYSICAL UPLINK CONTROL CHANNEL ENHANCEMENT FOR INDOOR COVERAGE HOLES

CROSS-REFERENCE TO RELATED APPLICATIONS

This application is a national stage application under 35 U.S.C. 371 of PCT/CN2020/085894, filed Apr. 21, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for using repetition with uplink control channels to enhance coverage in wireless networks.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved uplink communications for coverage enhancement.

Certain aspects of the subject matter described in this disclosure can be implemented in a method for wireless communication by a user equipment (UE). The method generally includes receiving a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Certain aspects of the subject matter described in this disclosure can be implemented in a method for wireless communication by a base station (BS). The method generally includes transmitting a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Certain aspects of the subject matter described in this disclosure can be implemented in an apparatus for wireless communication. The apparatus generally includes a processor configured to: receive a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and transmit at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor; and a memory coupled with the processor.

Certain aspects of the subject matter described in this disclosure can be implemented in an apparatus for wireless communication. The apparatus generally includes a processor configured to: transmit to a user equipment (UE) a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receive at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor; and a memory coupled with the processor.

Certain aspects of the subject matter described in this disclosure can be implemented in an apparatus for wireless communication. The apparatus generally includes means for receiving a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and means for transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Certain aspects of the subject matter described in this disclosure can be implemented in an apparatus for wireless communication. The apparatus generally includes means for transmitting to a user equipment (UE) a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and means for receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Certain aspects of the subject matter described in this disclosure can be implemented in a computer-readable medium for wireless communication. The computer-readable medium includes instructions that, when executed by a processing system, cause the processing system to perform operations generally including receiving a configuration of at least one of scheduling request (SR) resources or physical uplink control channel (PUCCH) resources, wherein the configuration indicates at least one of: a first SR resource having a first format and a second SR resource having the first format and a second repetition-factor; or a first PUCCH resource having a second format and a third repetition-factor and a second PUCCH resource having the second format and a fourth repetition-factor; and transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Certain aspects of the subject matter described in this disclosure can be implemented in a computer-readable medium for wireless communication. The computer-readable medium includes instructions that, when executed by a processing system, cause the processing system to perform operations generally including transmitting to a user equipment (UE) a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
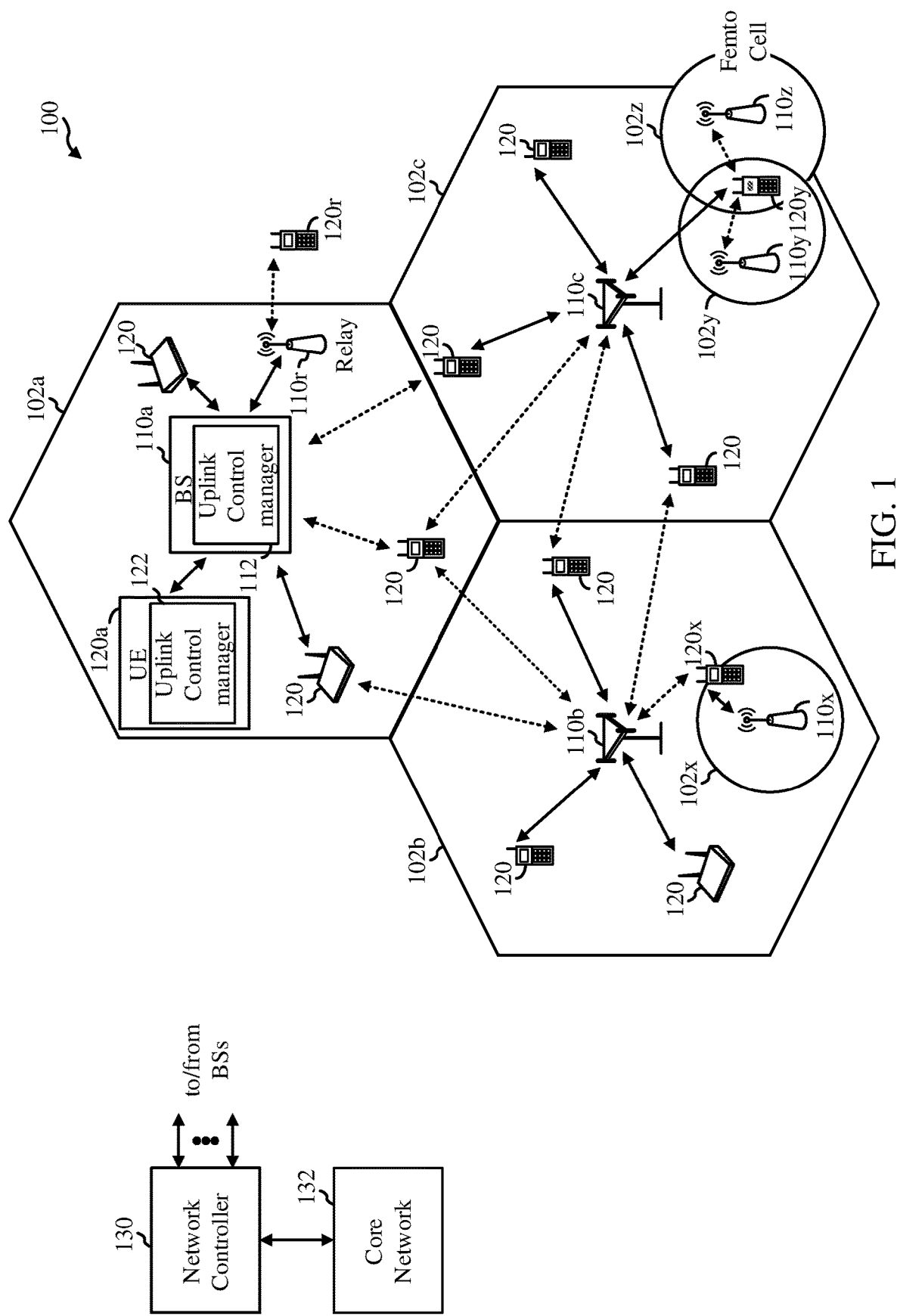
FIG. 1 is a block diagram conceptually illustrating an example wireless communication network, in accordance with certain aspects of the present disclosure.

Aspects of the present disclosure provide apparatus, methods, processing systems, and computer readable mediums for using repetition with uplink control channels to enhance coverage in wireless networks. In aspects of the present disclosure, techniques are provided to enhance coverage for urban scenarios (e.g., an outdoor next generation NodeB (gNB) serving indoor UEs), and rural scenarios, including extreme long distance rural scenarios (e.g., an inter-site distance (ISD) of 30 km). The provided techniques may be used in voice over Internet protocol (VoIP) and enhanced mobile broadband (eMBB) services. It is desirable to prioritize the coverage enhancement for uplink (UL) communications, including physical uplink shared channel (PUSCH) and physical uplink control channel (PUCCH), because downlink (DL) generally has better performance than UL, due to there typically being more transmit antennas at a gNB (i.e., for DL) than at a UE (i.e., for UL).

The following description provides examples of using repetition with uplink control channels to enhance coverage in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 and UEs 120 may be configured for using repetition with uplink control channels to enhance coverage in wireless networks. As shown in FIG. 1, the BS 110a includes an uplink control manager 112 that is configured for transmitting a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and for receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor, in accordance with aspects of the present disclosure. The UE 120*a* includes an uplink control manager 122 that is configured to receive a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and to transmit at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor, in accordance with aspects of the present disclosure.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
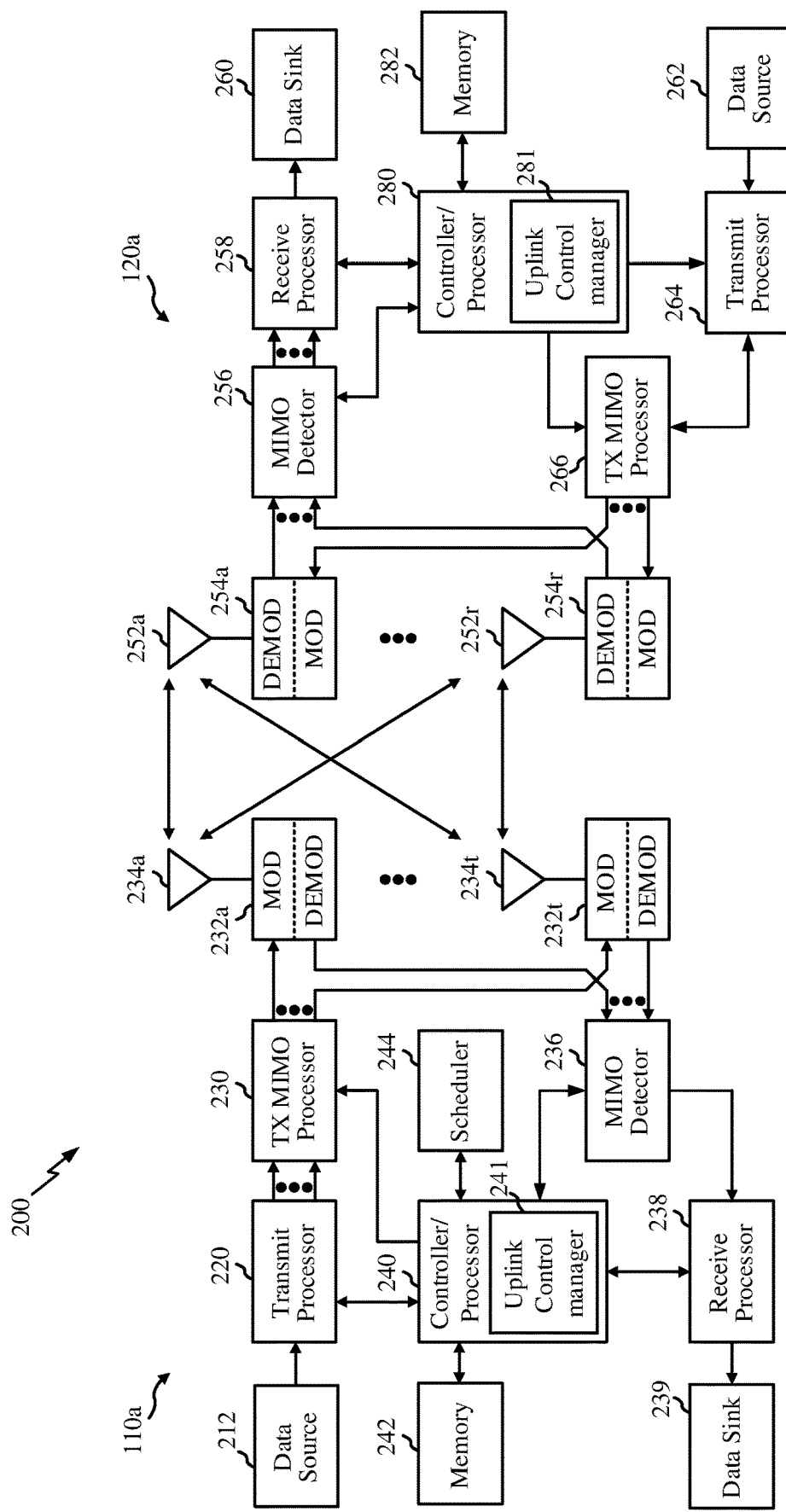
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has an uplink control manager 241 that transmits a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receives at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor, according to aspects described herein. As shown in FIG. 2, the controller/processor 280 of the UE 120*a* has an uplink control manager 281 that receives a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and transmits at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
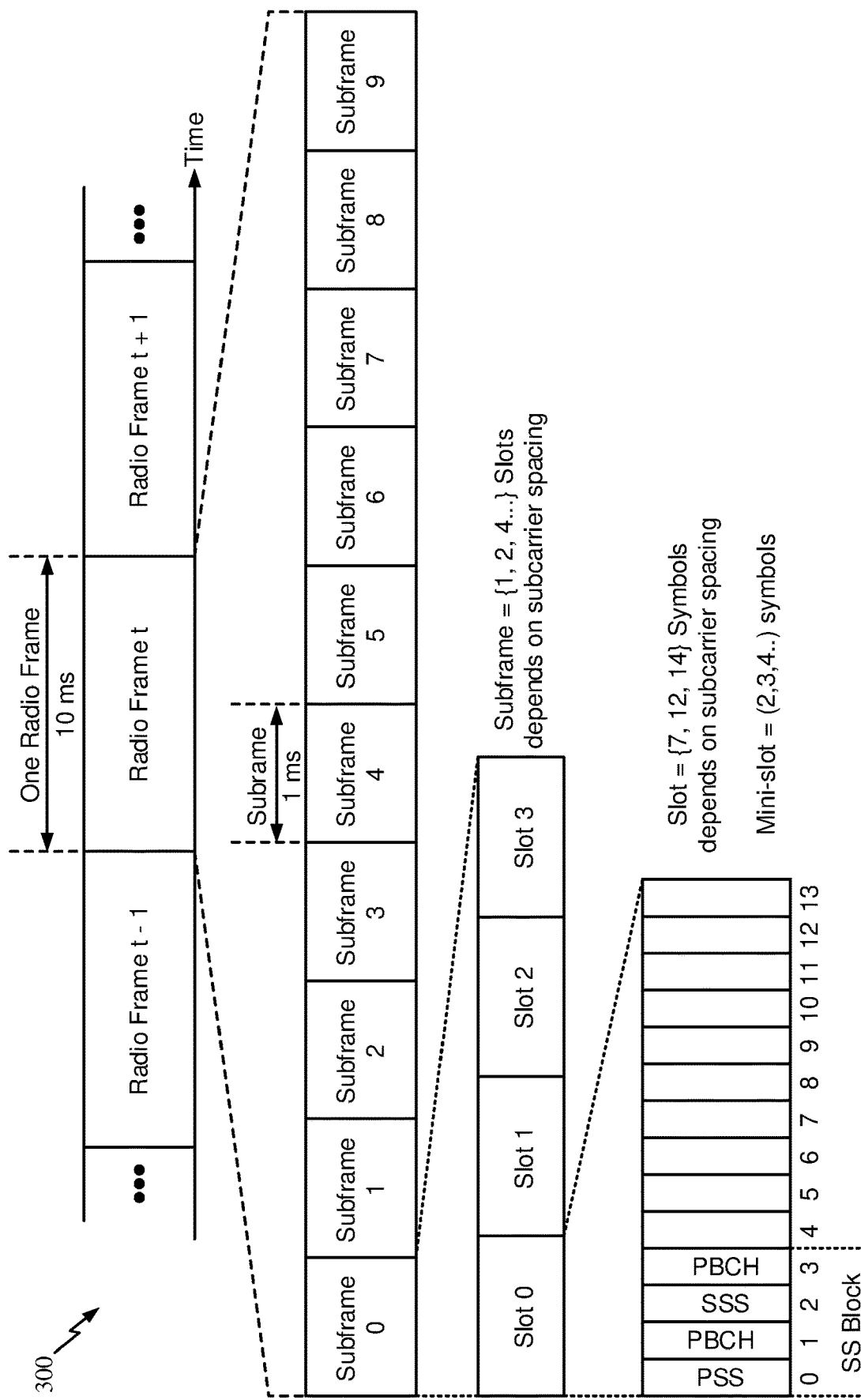
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In aspects of the present disclosure, PUCCH resources may be configured via radio resource control (RRC). Configurations of PUCCH resources include parameters in an information element (IE) named "PUCCH-Config" on a per bandwidth part (BWP) basis. A PUCCH-Config IE may include a "PUCCH-FormatConfig" IE, which may configure PUCCH-format-specific parameters including nrofSlots and SchedulingRequestResourceConfig. nrofSlots is a number of slots (n2, n4, n8) for PUCCH repetition, which is configured on a format-specific basis and applies to only PUCCHs of Format-1, Format-3, and Format-4 (i.e., excluding Format-0 and Format-2). If absent, a UE uses n1 as a default. SchedulingRequestResourceConfig is indicated on a per BWP basis and indicates that the corresponding resource may be used for scheduling requests (SRs). A UE can be configured with up to 8 of these as 8 SR resources. Each SchedulingRequestResourceConfig may include a periodicityAndOffset IE, which indicate a periodicity and offset of the PUCCH resource to be used for transmitting SR. Each SchedulingRequestResourceConfig may also include a resource IE, which is a PUCCH resource identifier (ID) for this SR resource. It should be noted that only resources with Format-0 or Format-1 are enabled to be used as SR resources.

In previously used techniques, a BS (e.g., a gNB) can only rely on RRC reconfiguration to change the PUCCH repetition-factor, which is a common repetition-factor for all PUCCH resources of one PUCCH format.

Figures 4A, 4B:
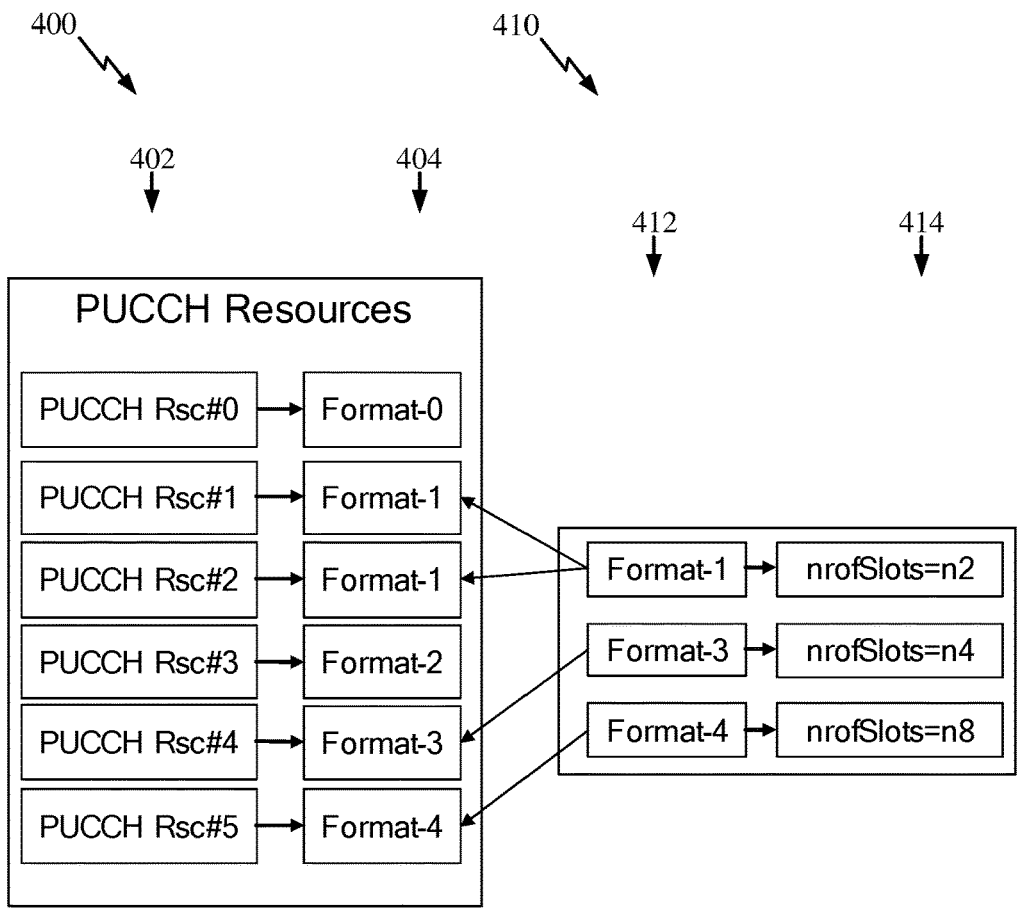
FIGS. 4A & 4B are tables showing exemplary characteristics of physical uplink control channel (PUCCH) resources, in accordance with certain aspects of the present disclosure.

FIG. 4A is a table 400 showing an exemplary set of PUCCH resources, in accordance with aspects of the present disclosure. As illustrated, each of the PUCCH resources in the column 402 has a corresponding format (e.g., Format-0, Format-1, Format-2, Format-3, and Format-4) in column 404. The table 410 shows an exemplary configuration of number of repetition slots, with each of Format-1, Format-3, and Format-4 in the column 412 has a corresponding number of repetition slots shown in column 414.

FIG. 4B is a table 450 showing characteristics of PUCCH formats, in accordance with aspects of the present disclosure. As illustrated, each of the PUCCH formats in the column 452 has a corresponding number of symbols in column 454, a number of uplink control information (UCI) bits in column 456, a waveform in column 458, and a brief description of the format in column 460.

Figure 5:
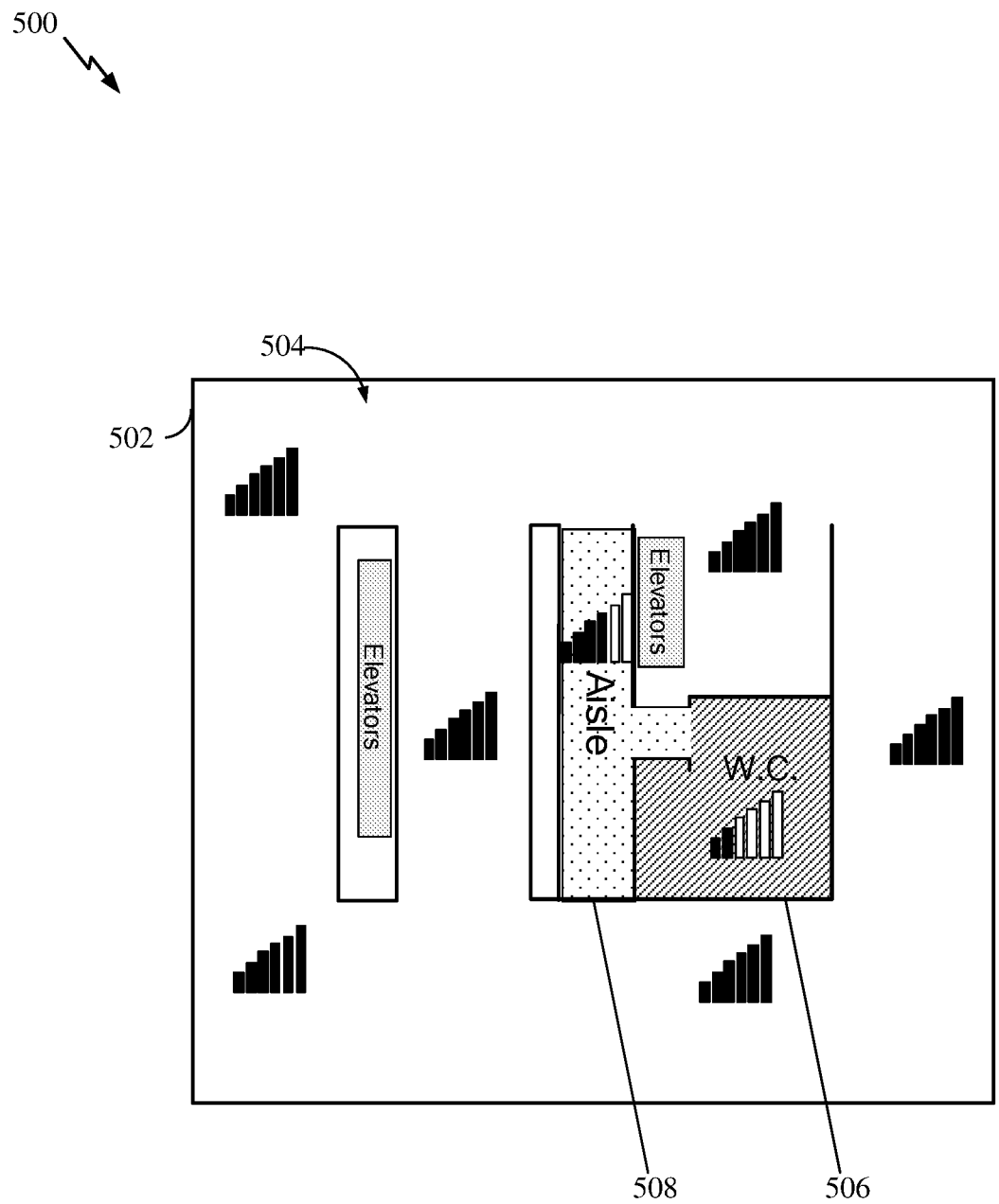
FIG. 5 is an exemplary map showing signal strength coverage within a building, in accordance with aspects of the present disclosure.

FIG. 5 is an exemplary map 500 showing signal strength coverage within a building 502, in accordance with aspects of the present disclosure. As illustrated, many areas 504 in the exemplary building have strong signal strength, while an area 506 in a water closet (w.c.) has poor signal strength. The DL signal strength in the aisle 508 towards the W.C. is also weaker than in the other public area, possibly due to less line-of-sight (LoS) propagation and more non-line-of-sight (NLoS) propagation from a UE (not shown) towards the gNB (not shown). The DL signal strength in the W.C. is much worse than in the other public area, due to the propagation being purely NLoS. In aspects of the present disclosure, directly using smart phones for browsing the Internet from inside the W.C. is generally impossible. Rebooting a smart phone (i.e., causing the smart phone to perform a new physical random access channel (PRACH) procedure) while the smart phone is in the W.C. typically enables browsing, although with low data rates. This is possibly because the gNB can configure repetition-factors for UL transmissions from the UE more easily shortly after a PRACH procedure. Phone calls from within the W.C. are also problematic, mainly due to problems with UL transmissions. DL transmissions to the UE are OK due to acceptable DL signal strength.

According to aspects of the present disclosure, some possible problems a user may encounter in using a UE in the W.C. are that while receiving DL signals is OK, UL coverage is even worse than DL, such that PUCCHs or PUSCHs cannot be delivered to the gNB by the UE. Particularly, when one walks into the W.C. through the aisle, there may not be UL resources to report the signal quality or to allow the gNB to measure the signal quality. When an UL transmission is needed, the RRC configured repetition-factor (Rep-Factor) may not enable successful decoding at the gNB. However, RRC reconfiguration of the Rep-Factor for PUCCH or PUSCH may not be efficient, because an acknowledgment (ACK) or a negative acknowledgment (NACK) of the RRC reconfiguration may not be delivered back to the gNB successfully.

In aspects of the present disclosure, PUCCH is more of a bottle-neck, since there is always at least an SR resource available that the UE can attempt to use, while PUSCH is not always scheduled.

Accordingly, what is needed are techniques and apparatus for using repetition with uplink control channels to enhance coverage in wireless networks.

Example Physical Uplink Control Channel Enhancement for Indoor Coverage Holes

Aspects of the present disclosure provide using repetition with uplink control channels to enhance coverage in wireless networks. In aspects of the present disclosure, techniques are provided to enhance coverage for urban scenarios (e.g., an outdoor next generation NodeB (gNB) serving indoor UEs), and rural scenarios, including extreme long distance rural scenarios (e.g., an inter-site distance (ISD) of 30 km). The provided techniques may be used in voice over Internet protocol (VoIP) and enhanced mobile broadband (eMBB) services. It is desirable to prioritize the coverage enhancement for uplink (UL) communications, including physical uplink shared channel (PUSCH) and physical uplink control channel (PUCCH), because downlink (DL) generally has better performance than UL, due to there typically being more transmit antennas at a gNB (i.e., for DL) than at a UE (i.e., for UL).

In aspects of the present disclosure, techniques to enhance PUCCH coverage (e.g., in indoor coverage holes, such as shown in FIG. 5) are provided.

In one technique to enhance PUCCH coverage, a small amount of SR resources with large repetition-factors are configured. These SR resources may be sufficient to guarantee basic PUCCH delivery to the gNB from a UE.

In another technique to enhance PUCCH coverage, PUCCH resource specific repetition-factor configuration is provided. Instead of all PUCCH resources configured with one format using a same number of repetitions, repetition-factors are configured specific to each PUCCH resource.

In still another technique to enhance PUCCH coverage, dynamic indication schemes to reconfigure PUCCH repetition-factors, which are more efficient than RRC reconfiguration, are provided.

Figure 6:
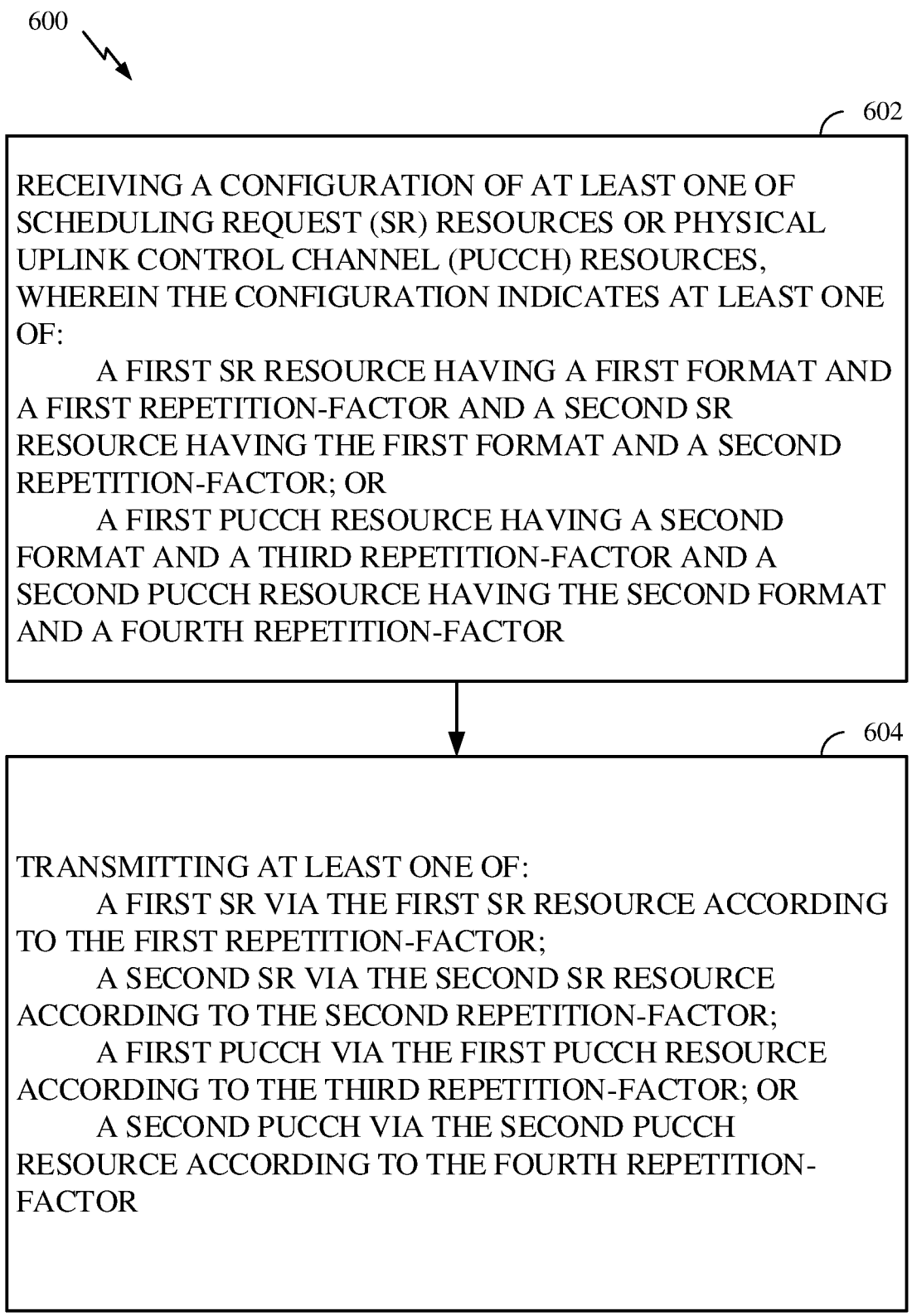
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., the UE 120a in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, by receiving a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor.

Operations 600 continue at block 604 by transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Figure 7:
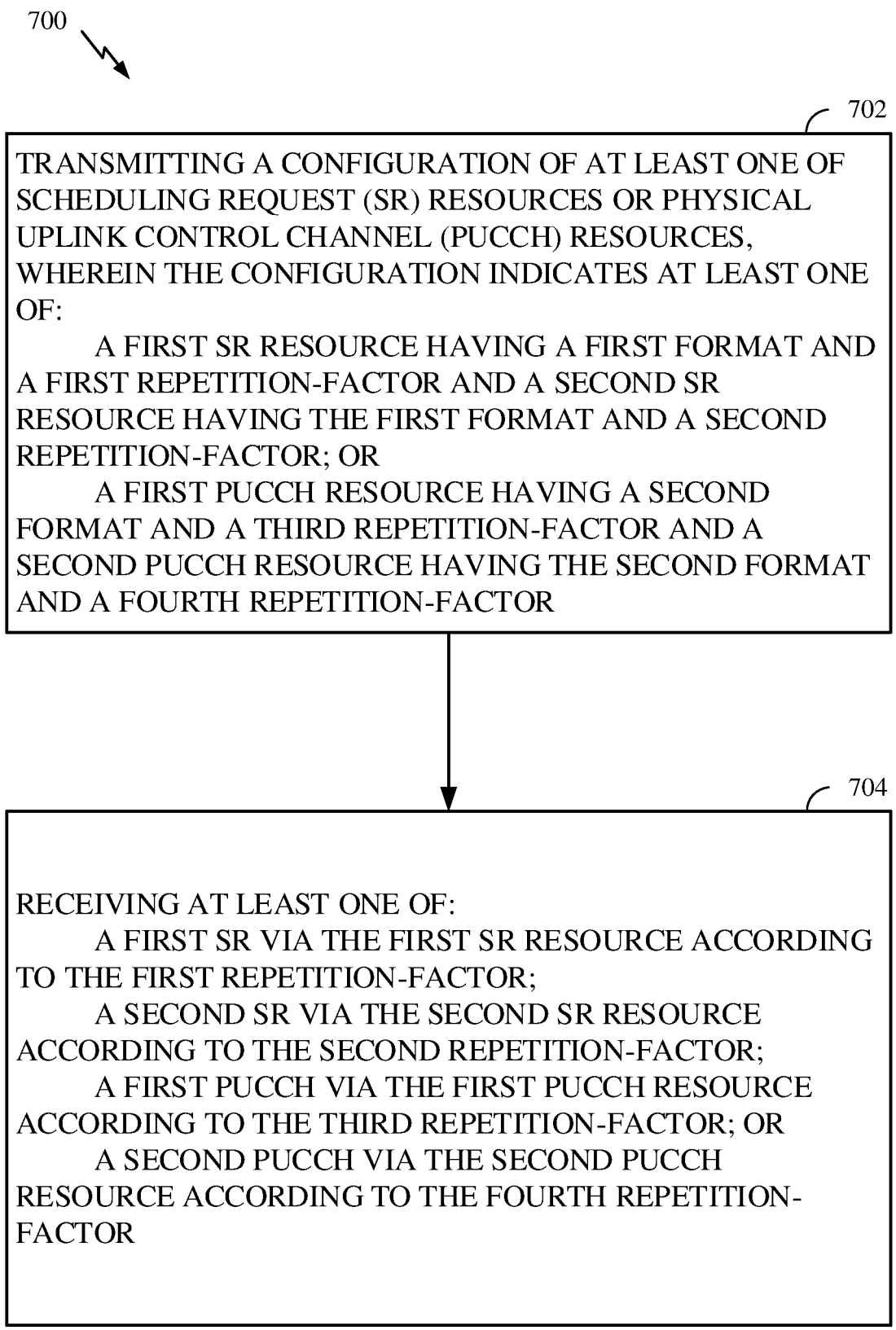
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., the BS 110a in the wireless communication network 100). The operations 700 may be complementary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at block 702, by transmitting a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor.

Operations 700 continue, at block 704, by receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

According to aspects of the present disclosure, per SR resource specific repetition-factor are provided. In such aspects of the present disclosure, when a BS (e.g., a gNB) uses RRC signaling to configure SR resources, one or more of the SR resources with PUCCH format-1 may include a PUCCH repetition-factor different from the repetition-factor configured for PUCCH format-1, which can overwrite the RRC configured PUCCH-common repetition-factor (i.e., overwrite the nrofSlots IE). At least one of the SR resources can be configured with the largest (e.g., largest supported by the wireless technology) repetition-factor to give the best-supported coverage, while the periodicityAndOffset of such SR resource can be configured relatively low. In these aspects of the present disclosure, configuring one of the SR resources enables the best-supported coverage for basic SR delivery to the gNB. In addition, receiving an SR via such an SR resource also allows the gNB to know that the UE is in a coverage hole, which enables the gNB to carry out additional efforts, e.g., RRC reconfiguration for that UE.

Figure 8:
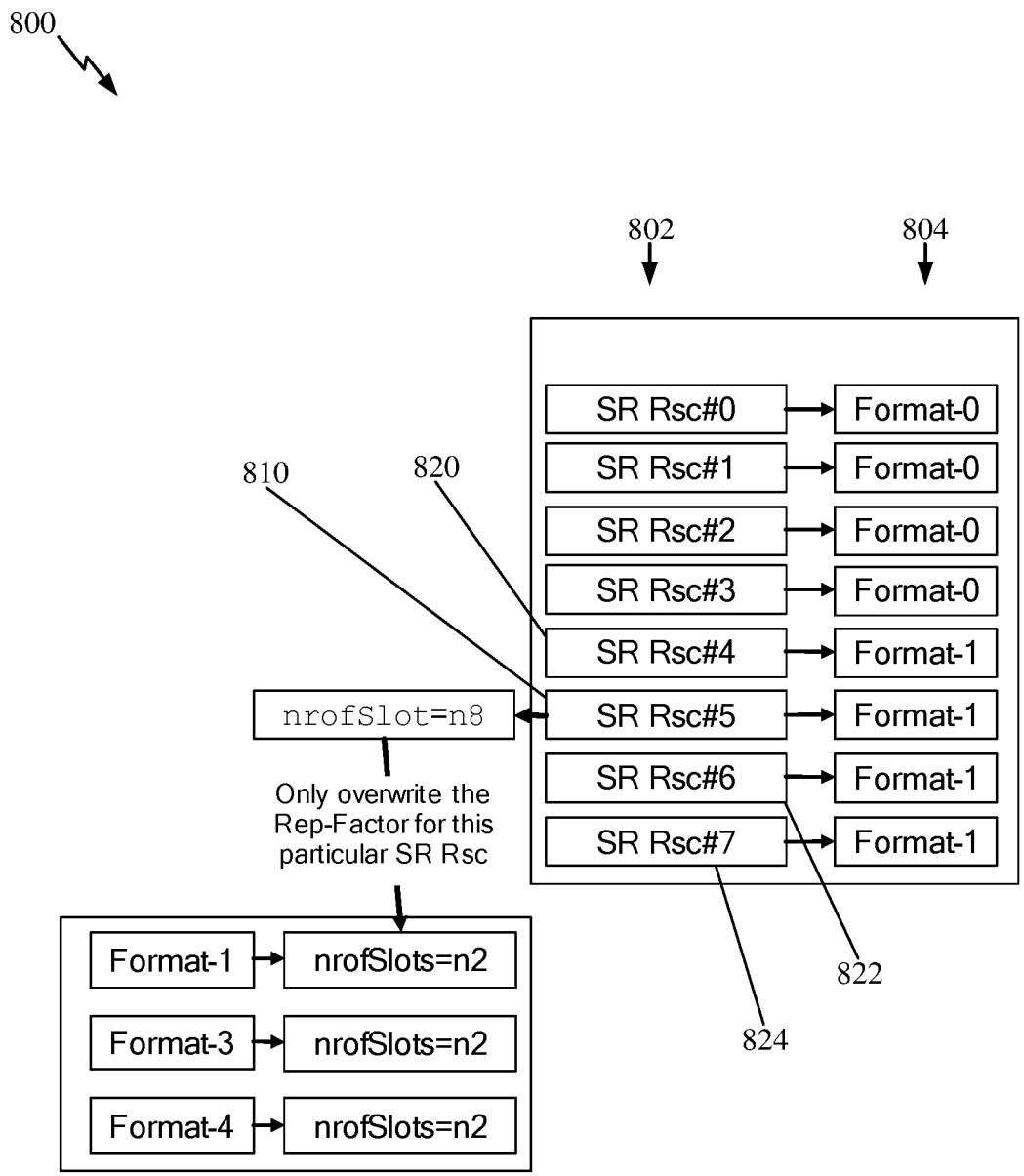
FIG. 8 is an exemplary table illustrating per SR resource specific repetition-factor assignments, in accordance with certain aspects of the present disclosure.

FIG. 8 shows an exemplary table 800 illustrating per SR resource specific repetition-factor assignments. As illustrated, each SR resource in column 802 has a corresponding format in column 804. In the illustrated table, SR resource 5 at 810 is configured with a repetition-factor of 8 (e.g., nrofSlots=n8), while SR resources 4, 6, and 7 at 820, 822, and 824 are configured with a repetition-factor of 2 (e.g., nrofSlots=n2), while each of the SR resources at 810, 820, 822, and 824 are format-1.

In aspects of the present disclosure, PUCCH resource specific repetition-factor configuration is provided. In such aspects, a UE may be configured with a PUCCH resource specific nrofSlots, instead of a PUCCH format specific nrofSlots. The PUCCH resource specific nrofSlots may be only applicable for Format-1, Format-3, or Format-4 as well.

According to aspects of the present disclosure, a UE may be configured with a nrofSlots for a PUCCH resource that is different from the nrofSlots associated with the corresponding PUCCH-format configuration, when the UE is configured with the PUCCH resource. That is, the nrofSlots configured in the PUCCH resource can overwrite the nrofSlots configured for the corresponding PUCCH-format configuration. For example, a UE may receive a configuration indicating that PUCCH format-1 has nrofSlots=2, and then, when the UE is configured with a PUCCH resource that has format-1 (e.g., PUCCH resource 5 at 810 in FIG. 8), the UE is also configured to have nrofSlots=8 for that PUCCH resource, and the nrofSlots=8 overwrites nrofSlots=2 for that PUCCH resource for that UE. The overwriting of the nrofSlots for the PUCCH resource may be accomplished via RRC signaling or DCI. As above, configuring a PUCCH resource with a repetition-factor different than a repetition-factor for other PUCCH resources of the same format may be only applicable for PUCCH resources having Format-1, Format-3, or Format-4 as well. In such aspects, a gNB may be able to dynamically indicate a PUCCH resource with a proper repetition-factor for coverage enhancement. Many previously known techniques (e.g., Rel-15) cannot achieve this dynamically.

Figure 9A:
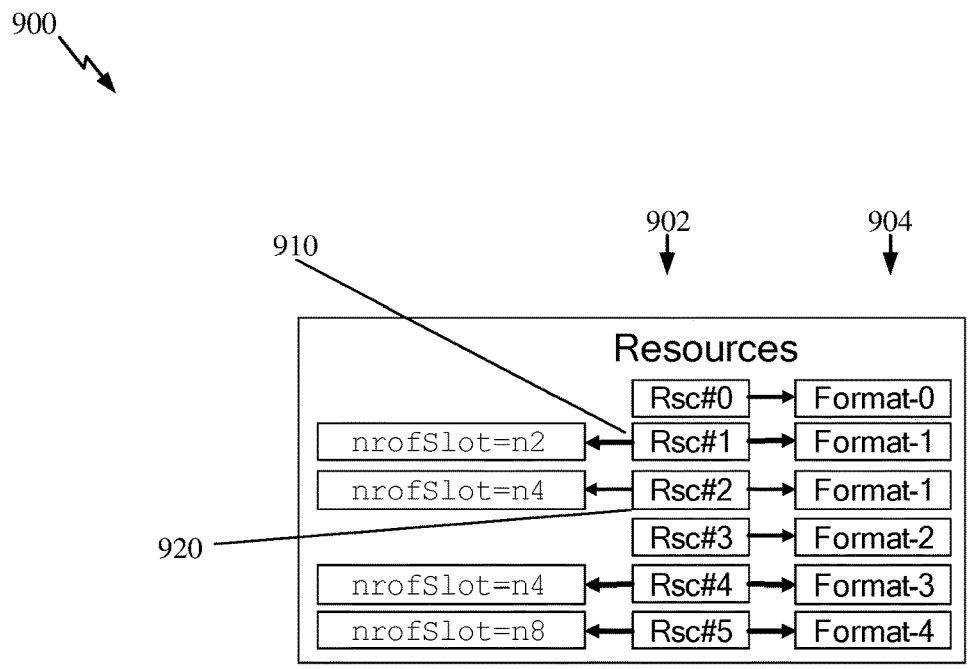
FIGS. 9A & 9B are exemplary tables illustrating per PUCCH resource specific repetition-factor assignments, in accordance with certain aspects of the present disclosure.
Figure 9B:
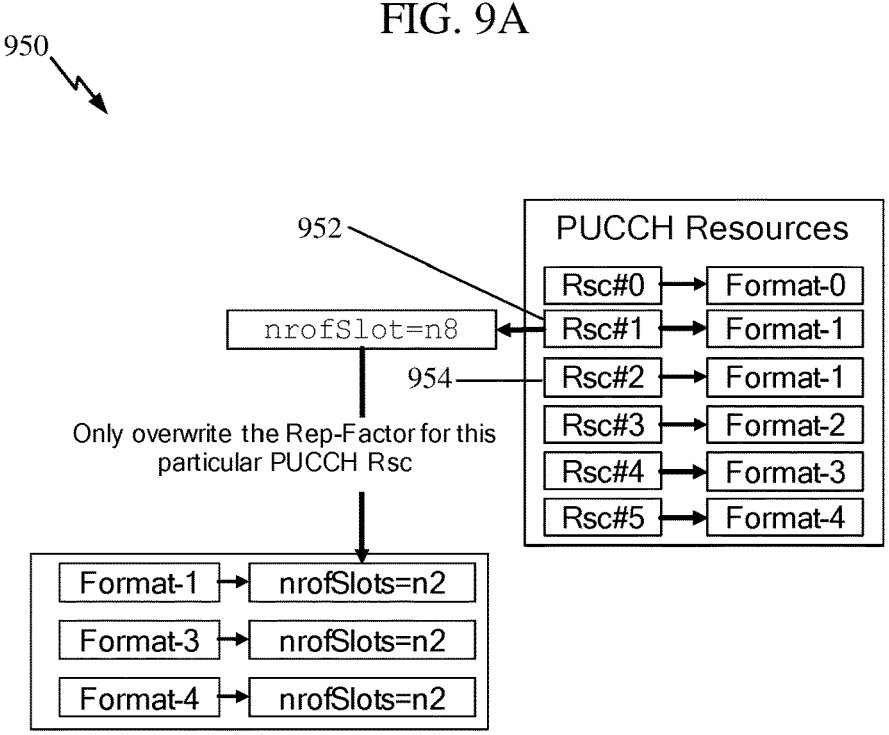

FIGS. 9A & 9B shows exemplary tables 900 and 950 illustrating per PUCCH resource specific repetition-factor assignments. As illustrated in table 900, each PUCCH resource in column 902 has a corresponding format in column 904. In the illustrated table 900, PUCCH resource 1 at 910 is configured with a repetition-factor of 2 (e.g., nrofSlots=n2), while PUCCH resource 2 at 920 is configured with a repetition-factor of 4 (e.g., nrofSlots=n4), while both of the SR resources at 910 and 920 are format-1. In table 950, PUCCH resource 1 at 952 and PUCCH resource 2 at 954 are both format-1 and originally configured (e.g., via RRC signaling) with repetition-factor of 2 (e.g., nrofSlots=n2). PUCCH resource 1 at 952 is dynamically changed to a repetition-factor of 8 (e.g., nrofSlots=n8) when the PUCCH resource is configured on a UE.

According to aspects of the present disclosure, a PUCCH repetition-factor may be dynamically indicated. In such aspects, a DCI (preferably a UL-grant DCI) can indicate that all RRC configured PUCCH repetition-factors for different PUCCH formats can be dynamically changed to the greatest level (e.g., the largest repetition-factor supported by the wireless technology). In such aspects, a single bit in a DCI can be used to indicate that all RRC configured PUCCH repetition-factors for different PUCCH formats be dynamically changed to the greatest level. This may give the gNB flexibility to efficiently re-configure the PUCCH repetition-factors, such that PUCCH coverage loss can be more effectively compensated. For example, in case such a DCI (e.g., a DCI indicating that all RRC configured PUCCH repetition-factors for different PUCCH formats can be dynamically changed to the greatest level) is missed by the UE, if an UL-grant DCI is used, and if the PUSCH or SRS scheduled by the UL-grant DCI is earlier than any upcoming PUCCH transmission opportunity for the UE, the gNB can determine this by detecting the scheduled PUSCH or SRS and determining (e.g., detecting how many repetitions are sent by the UE) whether the DCI was missed by the UE. If other DCI formats are used (or if the scheduled PUSCH or SRS is later than an upcoming PUCCH transmission opportunity), the gNB can reserve the repetition-slots for the PUCCH and detect the energy in the additional repetition-slots to figure out whether the DCI is missed.

In aspects of the present disclosure, PUCCHs may be multiplexed with SRs transmitted with the described repetition enhancements. In such aspects, If the UE determines that one or more positive SRs should be transmitted on another PUCCH resource other than the SR-dedicated PUCCH resource (e.g., when a PUCCH resource to transmit HARQ-ACK or CSI overlaps with the SR-dedicated PUCCH resource(s)), and if the repetition-factor configured for the actually used PUCCH resource is lower than a repetition-factor configured for at least one of the SR-dedicated PUCCH resource(s), then the UE may use a PUCCH resource with a repetition-factor that is the same as the repetition-factor configured for the SR-dedicated PUCCH resource having a maximum repetition-factor (e.g., maximum nrofSlots). Additionally or alternatively, the UE may use a repetition-factor for the PUCCH resource that is a function of the repetition-factor configured for the SR-dedicated PUCCH resource having a maximum repetition-factor. The function may be based at least in part on one of the following: (1) repetition-factor for the SR-dedicated PUCCH resource; (2) repetition-factor for the actually used PUCCH resource; (3) number of symbols for the SR-dedicated PUCCH resource; or (4) number of Symbols or resource blocks (RBs) of the actually used PUCCH resource.

Figure 10:
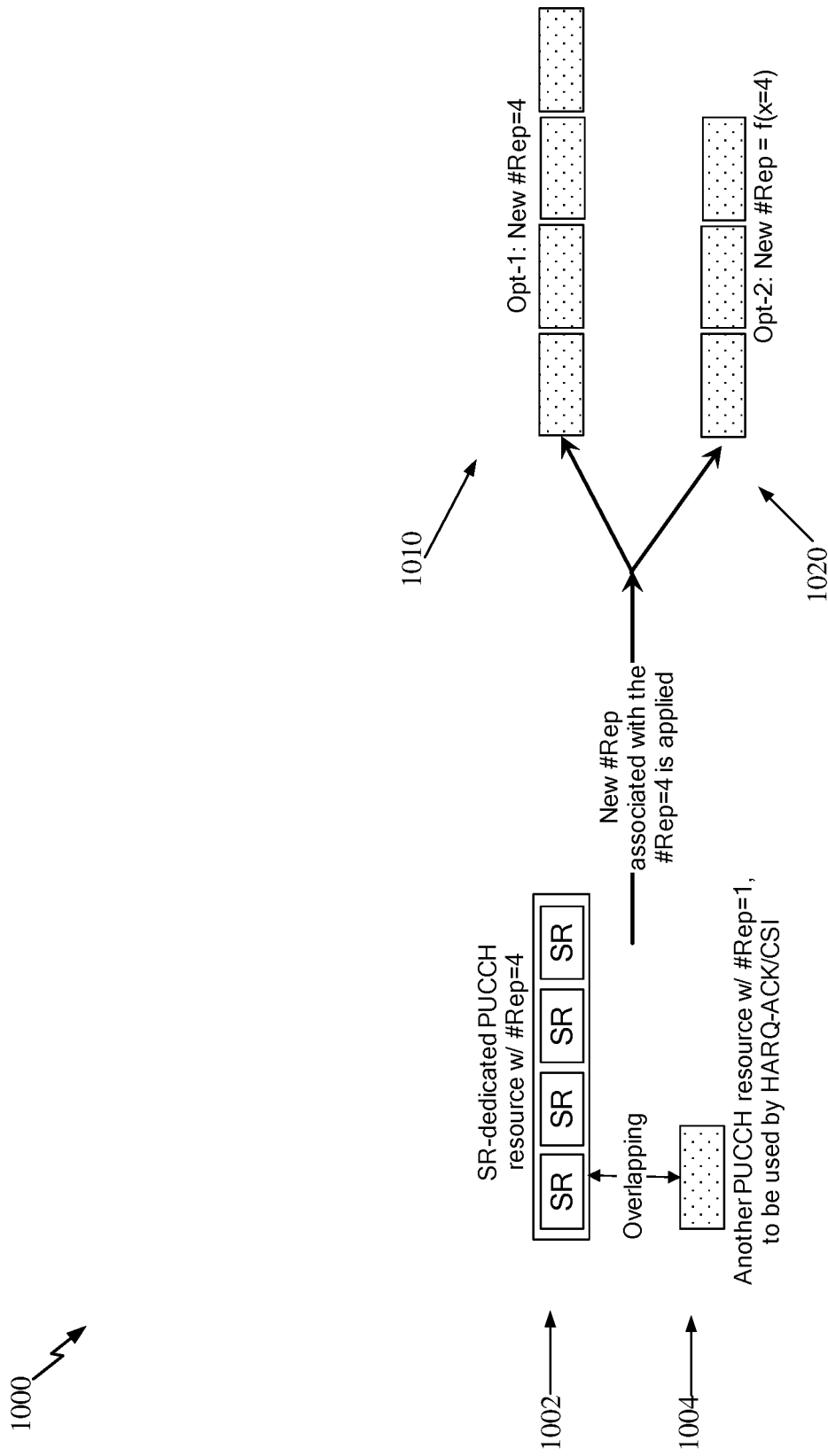
FIG. 10 is a schematic diagram illustrating PUCCH multiplexing, in accordance with aspects of the present disclosure.

FIG. 10 is a schematic diagram 1000 illustrating PUCCH multiplexing, according to aspects of the present disclosure. In the schematic diagram 1000, a UE (e.g., UE 120a, shown in FIG. 1) determines to transmit an SR with a repetition-factor of 4, as shown at 1002, and the SR overlaps with another PUCCH at 1004. In aspects of the present disclosure, the UE may transmit the multiplexed PUCCH and SR with a repetition-factor of 4, as shown at 1010. Additionally or alternatively, the UE may use a repetition-factor for the PUCCH resource that is a function of the repetition-factor configured for the SR-dedicated PUCCH resource having a maximum repetition-factor, as shown at 1020.

Figure 11:
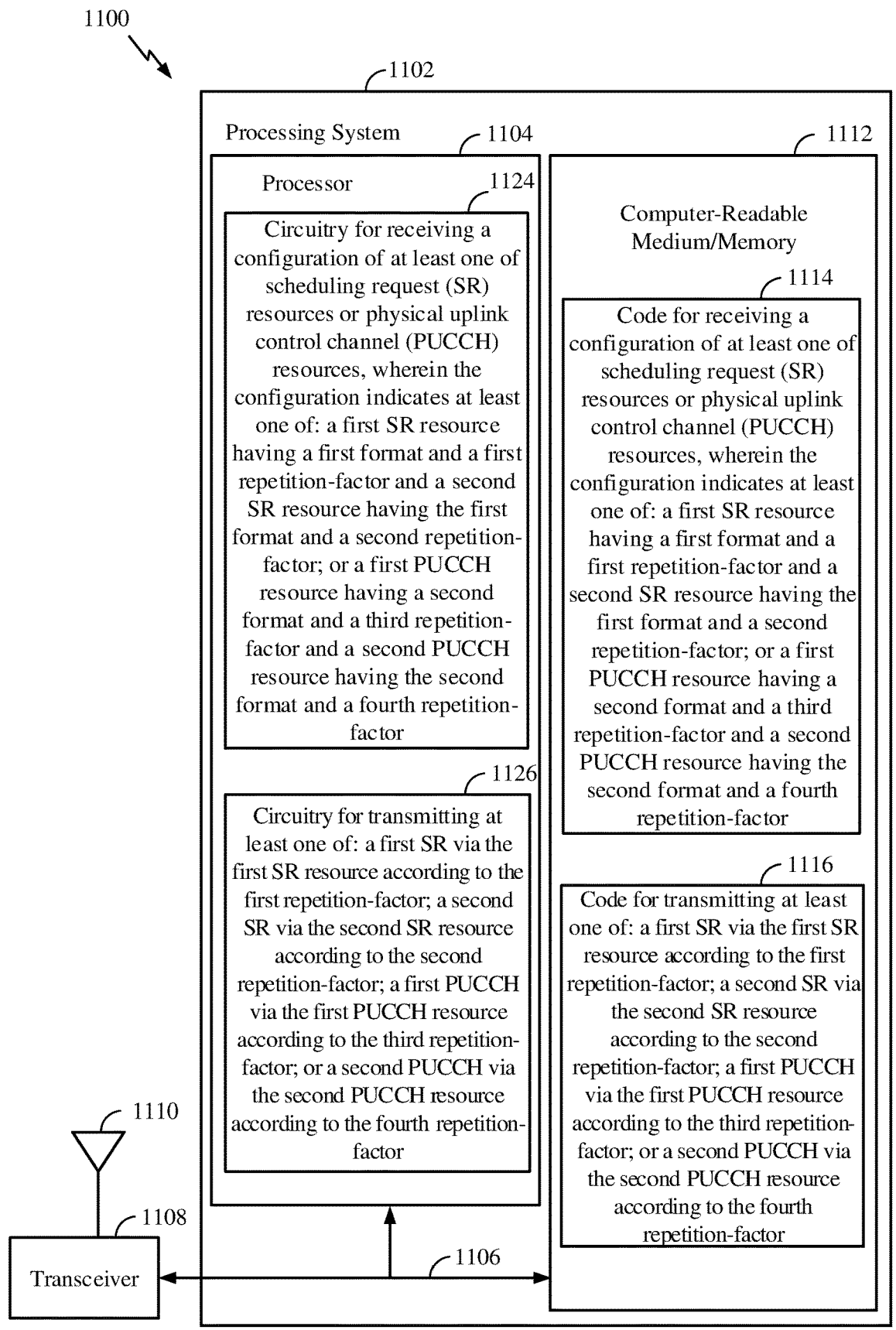
FIG. 11 illustrates a communications device that may include various components configured to perform the operations illustrated in FIG. 6, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein for using repetition with uplink control channels to enhance coverage in wireless networks. In certain aspects, computer-readable medium/memory 1112 stores code 1114 for receiving a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and code 1116 for transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor, etc. In certain aspects, the processor 1104 has circuitry configured to implement the code stored in the computer-readable medium/memory 1112. The processor 1104 includes circuitry 1124 for receiving a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; circuitry 1126 for transmitting at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

Figure 12:
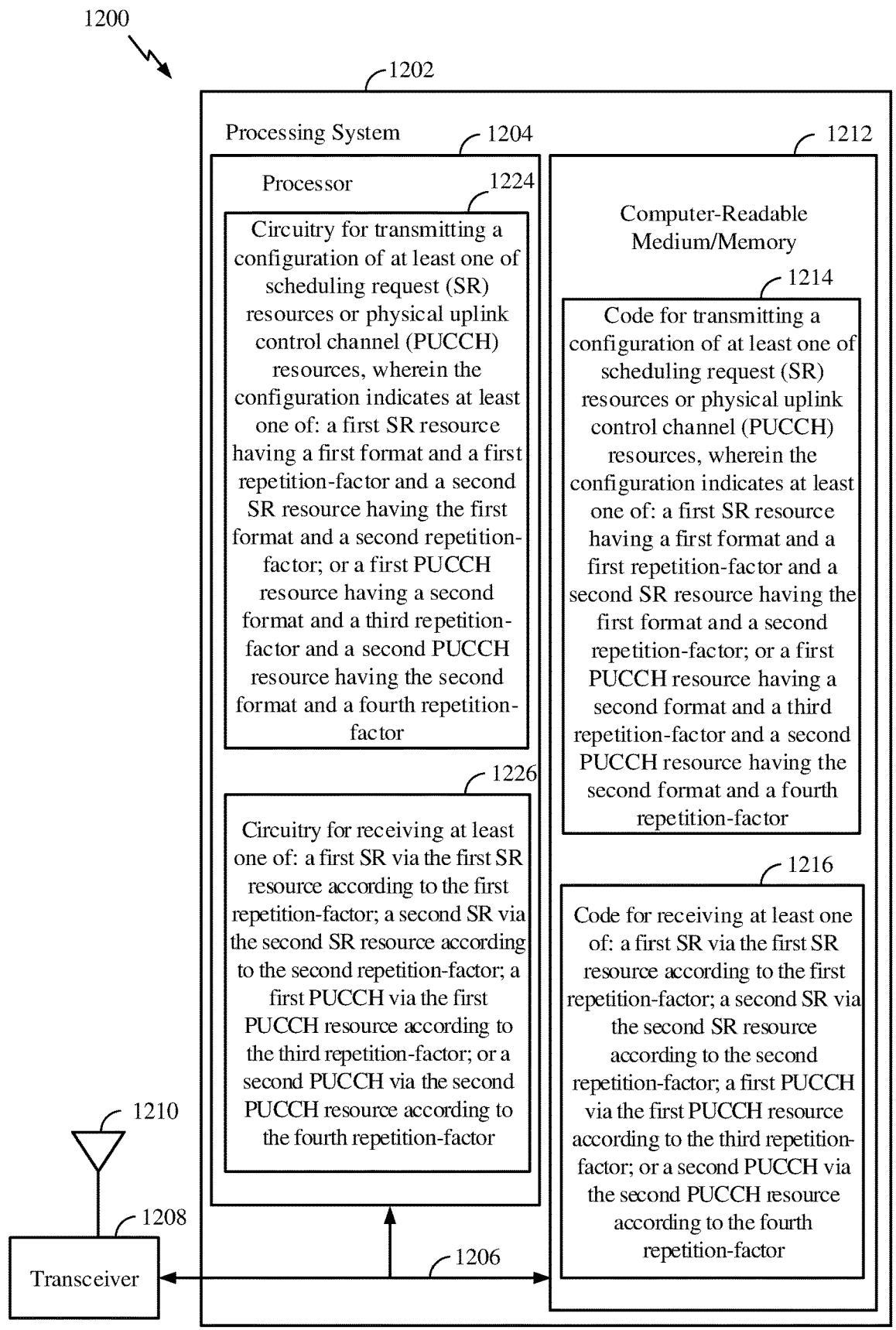
FIG. 12 illustrates a communications device that may include various components configured to perform the operations illustrated in FIG. 7, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7, or other operations for performing the various techniques discussed herein for using repetition with uplink control channels to enhance coverage in wireless networks. In certain aspects, computer-readable medium/memory 1212 stores code 1214 for transmitting a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and code 1216 for receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor. In certain aspects, the processor 1204 has circuitry configured to implement the code stored in the computer-readable medium/memory 1212. The processor 1204 includes circuitry 1224 for transmitting a configuration of at least one of scheduling request (SR) resources or physical uplink control channel (PUCCH) resources, wherein the configuration indicates at least one of: a first SR resource having a first format and a first repetition-factor and a second SR resource having the first format and a second repetition-factor; or a first PUCCH resource having a second format and a third repetition-factor and a second PUCCH resource having the second format and a fourth repetition-factor; circuitry 1226 for receiving at least one of: a first SR via the first SR resource according to the first repetition-factor; a second SR via the second SR resource according to the second repetition-factor; a first PUCCH via the first PUCCH resource according to the third repetition-factor; or a second PUCCH via the second PUCCH resource according to the fourth repetition-factor.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving a configuration of at least one of scheduling request (SR) resources or physical uplink control channel (PUCCH) resources, wherein the configuration indicates at least one of:
a first SR resource having a first format and a first repetition-factor and a second SR resource having the first format and a second repetition-factor; or
a first PUCCH resource having a second format and a third repetition-factor and a second PUCCH resource having the second format and a fourth repetition-factor; and
transmitting at least one of:
a first SR via the first SR resource according to the first repetition-factor;
a second SR via the second SR resource according to the second repetition-factor;
a first PUCCH via the first PUCCH resource according to the third repetition-factor; or
a second PUCCH via the second PUCCH resource according to the fourth repetition-factor.

2. The method of claim 1, wherein the configuration is received via a downlink control information (DCI).

3. The method of claim 1, wherein receiving the configuration comprises:
receiving a first indication that the first PUCCH resource and the second PUCCH resource have the third repetition-factor; and
receiving a second indication that the second PUCCH resource has the fourth repetition-factor, subsequent to receiving the first indication.

4. The method of claim 1, wherein receiving the configuration comprises:
receiving a first configuration indicating the first PUCCH resource has the second format and the third repetition-factor and the second PUCCH resource has the second format and the third repetition-factor; and
receiving a second configuration, subsequent to receiving the first configuration, configuring the UE to transmit the second PUCCH via the second PUCCH resource according to the fourth repetition-factor and not altering the first PUCCH resource configuration.

5. The method of claim 1, further comprising:
receiving a downlink control information (DCI) directing the UE to dynamically change the first PUCCH resource and the second PUCCH resource to have a maximum repetition-factor.

6. The method of claim 1, further comprising:
determining to transmit the first SR multiplexed with the first PUCCH according to a maximum of the first repetition-factor and the third repetition-factor, based on at least one repetition of the first SR resource occurring at a same time as at least one repetition of the first PUCCH resource.

7. The method of claim 1, further comprising:
determining to transmit the first SR multiplexed with the first PUCCH according to a function of the first repetition-factor associated with the first SR resource, the third repetition-factor associated with the first PUCCH resource, a number of OFDM symbols comprised by the first SR resource, and a number of RBs and/or OFDM symbols comprised by the first PUCCH resource, based on at least one repetition of the first SR resource occurring at a same time as at least one repetition of the first PUCCH resource.

8. A method for wireless communications by a base station (BS), comprising:
transmitting to a user equipment (UE) a configuration of at least one of scheduling request (SR) resources or physical uplink control channel (PUCCH) resources, wherein the configuration indicates at least one of:
a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receiving at least one of:
a first SR via the first SR resource according to the first repetition-factor;
a second SR via the second SR resource according to the second repetition-factor;
a first PUCCH via the first PUCCH resource according to the third repetition-factor; or
a second PUCCH via the second PUCCH resource according to the fourth repetition-factor.

9. The method of claim 8, wherein the configuration is transmitted via a downlink control information (DCI).

10. The method of claim 8, wherein transmitting the configuration comprises:
transmitting a first indication that the first PUCCH resource and the second PUCCH resource have the third repetition-factor; and
transmitting a second indication that the second PUCCH resource has the fourth repetition-factor, subsequent to receiving the first indication.

11. The method of claim 8, wherein transmitting the configuration comprises:
transmitting a first configuration indicating the first PUCCH resource has the second format and the third repetition-factor and the second PUCCH resource has the second format and the third repetition-factor; and
transmitting a second configuration, subsequent to transmitting the first configuration, configuring the UE to transmit the second PUCCH via the second PUCCH resource according to the fourth repetition-factor and not altering the first PUCCH resource configuration.

12. The method of claim 8, further comprising:
transmitting a downlink control information (DCI) directing the UE to dynamically change the first PUCCH resource and the second PUCCH resource to have a maximum repetition-factor.

13. The method of claim 8, further comprising:
receiving the first SR multiplexed with the first PUCCH according to a maximum of the first repetition-factor and the third repetition-factor, wherein at least one repetition of the first SR resource occurs at a same time as at least one repetition of the first PUCCH resource.

14. The method of claim 8, further comprising:
receiving the first SR multiplexed with the first PUCCH according to a function of the first repetition-factor associated with the first SR resource, the third repetition-factor associated with the first PUCCH resource, a number of OFDM symbols comprised by the first SR resource, and a number of RBs and/or OFDM symbols comprised by the first PUCCH resource, wherein at least one repetition of the first SR resource occurs at a same time as at least one repetition of the first PUCCH resource.

15. An apparatus for wireless communications, comprising:
a processor configured to:
receive a configuration of at least one of scheduling request (SR) resources or physical uplink control channel (PUCCH) resources, wherein the configuration indicates at least one of:
a first SR resource having a first format and a first repetition-factor and a second SR resource having the first format and a second repetition-factor; or
a first PUCCH resource having a second format and a third repetition-factor and a second PUCCH resource having the second format and a fourth repetition-factor; and
transmit at least one of:
a first SR via the first SR resource according to the first repetition-factor;
a second SR via the second SR resource according to the second repetition-factor;
a first PUCCH via the first PUCCH resource according to the third repetition-factor; or
a second PUCCH via the second PUCCH resource according to the fourth repetition-factor; and
a memory coupled with the processor.

16. An apparatus for wireless communications, comprising:
a processor configured to:
transmit to a user equipment (UE) a configuration of at least one of scheduling request (SR) resources or physical uplink control channel (PUCCH) resources, wherein the configuration indicates at least one of:
a first SR resource having a first format and a first repetition-factor and a second SR resource having the first format and a second repetition-factor; or
a first PUCCH resource having a second format and a third repetition-factor and a second PUCCH resource having the second format and a fourth repetition-factor; and
receive at least one of:
a first SR via the first SR resource according to the first repetition-factor;
a second SR via the second SR resource according to the second repetition-factor;
a first PUCCH via the first PUCCH resource according to the third repetition-factor; or
a second PUCCH via the second PUCCH resource according to the fourth repetition-factor; and
a memory coupled with the processor.

17. An apparatus for wireless communications, comprising:
means for receiving a configuration of at least one of scheduling request (SR) resources or physical uplink control channel (PUCCH) resources, wherein the configuration indicates at least one of:
a first SR resource having a first format and a first repetition-factor and a second SR resource having the first format and a second repetition-factor; or
a first PUCCH resource having a second format and a third repetition-factor and a second PUCCH resource having the second format and a fourth repetition-factor; and
means for transmitting at least one of:
a first SR via the first SR resource according to the first repetition-factor;
a second SR via the second SR resource according to the second repetition-factor;
a first PUCCH via the first PUCCH resource according to the third repetition-factor; or
a second PUCCH via the second PUCCH resource according to the fourth repetition-factor.

18. An apparatus for wireless communications, comprising:
means for transmitting to a user equipment (UE) a configuration of at least one of scheduling request (SR) resources or physical uplink control channel (PUCCH) resources, wherein the configuration indicates at least one of:

a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and means for receiving at least one of:

a first SR via the first SR resource according to the first repetition-factor;

a second SR via the second SR resource according to the second repetition-factor;

a first PUCCH via the first PUCCH resource according to the third repetition-factor; or a second PUCCH via the second PUCCH resource according to the fourth repetition-factor.

19. A non-transitory computer-readable medium for wireless communications including instructions that, when executed by a processing system, cause the processing system to perform operations comprising:

receiving a configuration of at least one of scheduling request (SR) resources or physical uplink control channel (PUCCH) resources, wherein the configuration indicates at least one of:

a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and transmitting at least one of:

a first SR via the first SR resource according to the first repetition-factor;

a second SR via the second SR resource according to the second repetition-factor;

a first PUCCH via the first PUCCH resource according to the third repetition-factor; or a second PUCCH via the second PUCCH resource according to the fourth repetition-factor.

20. A non-transitory computer-readable medium for wireless communications including instructions that, when executed by a processing system, cause the processing system to perform operations comprising:

transmitting to a user equipment (UE) a configuration of at least one of scheduling request (SR) resources or physical uplink control channel (PUCCH) resources, wherein the configuration indicates at least one of:

a first SR resource having a first format and a first repetition-factor and a second SR resource having the first format and a second repetition-factor; or a first PUCCH resource having a second format and a third repetition-factor and a second PUCCH resource having the second format and a fourth repetition-factor; and receiving at least one of:

a first SR via the first SR resource according to the first repetition-factor;

a second SR via the second SR resource according to the second repetition-factor;

a first PUCCH via the first PUCCH resource according to the third repetition-factor; or a second PUCCH via the second PUCCH resource according to the fourth repetition-factor.

* * * * *